United States Patent
Brinkman et al.

(10) Patent No.: US 11,864,073 B2
(45) Date of Patent: Jan. 2, 2024

(54) WIRELESS TRAILER CONNECTION

(71) Applicant: GM GLOBAL TECHNOLOGY OPERATIONS LLC, Detroit, MI (US)

(72) Inventors: Todd J. Brinkman, Rochester Hills, MI (US); Ralph David Schlottke, Whitby (CA); Curtis L Hay, Washington Township, MI (US); Priya B. Abraham, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 120 days.

(21) Appl. No.: 17/658,868

(22) Filed: Apr. 12, 2022

(65) Prior Publication Data
US 2023/0328490 A1    Oct. 12, 2023

(51) Int. Cl.
| | |
|---|---|
| *H04W 4/46* | (2018.01) |
| *H04W 4/02* | (2018.01) |
| *B60D 1/62* | (2006.01) |
| *B60T 8/32* | (2006.01) |
| *B60Q 1/30* | (2006.01) |
| *B60T 8/176* | (2006.01) |

(52) U.S. Cl.
CPC ............... *H04W 4/46* (2018.02); *B60D 1/62* (2013.01); *B60Q 1/305* (2013.01); *B60T 8/176* (2013.01); *B60T 8/323* (2013.01); *H04W 4/023* (2013.01); *B60T 2210/36* (2013.01); *B60T 2270/10* (2013.01)

(58) Field of Classification Search
CPC ......... H04W 4/46; H04W 4/023; B60T 8/176; B60T 8/323; B60T 2210/36; B60T 2270/10; B60D 1/62; B60Q 1/305
See application file for complete search history.

(56) References Cited

U.S. PATENT DOCUMENTS

| | | | | |
|---|---|---|---|---|
| 2002/0125771 | A1* | 9/2002 | Kaminski | ............... B60D 1/62 |
| | | | | 307/10.1 |
| 2013/0179047 | A1* | 7/2013 | Miller | .................. B60W 30/09 |
| | | | | 701/70 |
| 2019/0049991 | A1* | 2/2019 | Laur | ................... B60W 30/165 |
| 2019/0389260 | A1* | 12/2019 | Niewiadomski | ..... B62D 15/025 |
| 2019/0391590 | A1* | 12/2019 | Niewiadomski | ........ G01L 5/136 |
| 2022/0105912 | A1* | 4/2022 | Fosdike | ................ B60R 16/023 |
| 2022/0105913 | A1* | 4/2022 | Fosdike | .................. B60T 8/171 |
| 2022/0219607 | A1* | 7/2022 | Freeman-Powell | ... B60W 50/14 |
| 2022/0303743 | A1* | 9/2022 | Lansford | ................ B60D 1/305 |
| 2022/0410895 | A1* | 12/2022 | Salter | ...................... B60L 53/68 |

* cited by examiner

*Primary Examiner* — Ojiako K Nwugo
(74) *Attorney, Agent, or Firm* — Lorenz & Kopf LLP (57) ABSTRACT

A method for enabling a V2V communications link between a trailer and a first tow vehicle including receiving a towing system activation control signal, transmitting a tow vehicle request, receiving a first tow vehicle response including a first tow vehicle location and a first tow vehicle identifier, determining a first distance between the first tow vehicle and the trailer, and enabling the V2V communications link in response to the first distance being less than a threshold distance.

20 Claims, 6 Drawing Sheets

WIRELESS TRAILER CONNECTION

INTRODUCTION

The present disclosure relates generally to a system for providing vehicle to trailer data communications within a motor vehicle. More specifically, aspects of the present disclosure relate to systems, methods and devices for determining a trailering state of a towing vehicle, establishing a communications link between the towing vehicle and a trailer and transmitting data between the towing vehicle and the trailer during towing operations.

Personal motor vehicles have long been fitted with equipment to tow a trailer behind the vehicle. These trailers may include camping trailers, boat trailers or utility trailers. These trailers are typically physically connected to a vehicle trailer hitch mechanically fixed to a towing vehicle frame. The trailers are connected to the trailer hitch with a hitch arrangement coupled to a frame of the trailer. In addition, electrical connections are provided between the towing vehicle and the trailer to supply electrical power to trailer lighting and braking systems, as well as to couple electronic signals to control the application of the trailer brakes and illumination of various trailer lights, such as brake lights, turn signal lights, reverse lights and the like.

Difficulty arises in that a driver must physically connected and disconnect the electrical connection between the trailer and the towing vehicle. In addition, these wires running between the trailer and the towing vehicle are susceptible to damage during the towing operation due to articulation and vibration of the trailer, foreign objects contacting the wires and connector, as well as degradation due to weather conditions. Requiring an operator to physically complete the electrical connection greatly reduces the level of autonomy for autonomous vehicle trailering applications. In addition, establishing the trailer wireless communications connection between a particular towing vehicle and particular trailer in a congested towing environment, such as a boat ramp or campground, may cause additional problems without significant human intervention. It would be desirable to provide a means for providing data communications between a towing vehicle and a trailer while overcoming the aforementioned problems.

SUMMARY

Disclosed herein are vehicle sensor methods and systems and related control logic for provisioning vehicle systems, methods for making and methods for operating such systems, and motor vehicles equipped with onboard control systems. By way of example, and not limitation, there are presented various embodiments of systems for the establishment of wireless data communications between a towing vehicle and a trailer.

In accordance with an aspect of the present disclosure, a method for enabling a V2V communications link between a trailer and a first tow vehicle including receiving a towing system activation control signal, transmitting a tow vehicle request, receiving a first tow vehicle response including a first tow vehicle location and a first tow vehicle identifier, determining a first distance between the first tow vehicle and the trailer, enabling the V2V communications link in response to the first distance being less than a threshold distance.

In accordance with another aspect of the present disclosure wherein the threshold distance is two times an average towing vehicle length.

In accordance with an aspect of the present disclosure, a method including receiving a second tow vehicle response including a second tow vehicle location and a second tow vehicle identifier, determining a second distance between the trailer and the second tow vehicle and enabling the V2V communications link between the trailer and the first tow vehicle in response to the first distance being less than the second distance.

In accordance with an aspect of the present disclosure, a method where the towing system activation control signal is received from a user interface.

In accordance with an aspect of the present disclosure, a method wherein the towing system activation control signal is generated in response to a trailer hitch being coupled to a tow vehicle hitch.

In accordance with an aspect of the present disclosure, a method wherein the tow vehicle response includes a tow vehicle velocity and wherein the V2V communications link is enabled in response to the tow vehicle velocity matching a trailer velocity.

In accordance with an aspect of the present disclosure, a method wherein the V2V communications link is enabled in response to a user confirmation at the first tow vehicle.

In accordance with an aspect of the present disclosure, a method including receiving a trailer light control signal via the V2V communications link and controlling a trailering lighting system in response to the trailer light control signal.

In accordance with an aspect of the present disclosure, a method including receiving a trailer brake control signal via the V2V communications link and controlling a trailer braking system in response to the trailer light control signal.

In accordance with an aspect of the present disclosure, a method including receiving a first tow vehicle antilock braking control signal via the V2V communications link and controlling a trailer antilock braking system in response to the first tow vehicle antilock braking control signal.

In accordance with an aspect of the present disclosure, a trailer controller including a control input configured to receive a towing system activation control signal, a V2V communications transceiver for transmitting a tow vehicle request, receiving a first tow vehicle response including a first tow vehicle location and a first tow vehicle identifier, a location detector configured for detecting a trailer location, and a processor configured for determining a first distance between the first tow vehicle and the trailer in response to the first tow vehicle location and the trailer location, enabling the V2V communications link in response to the first distance being less than a threshold distance.

In accordance with an aspect of the present disclosure, a trailer controller wherein the V2V communications transceiver is further operative to establish the V2V communications link with a first tow vehicle in response to the processor enabling the V2V communications link.

In accordance with an aspect of the present disclosure, a trailer controller wherein the V2V communications transceiver is further operative to receive a trailer control signal from a first tow vehicle via the V2V communications link and wherein the processor is further configured to control a trailer brake in response to the trailer control signal.

In accordance with an aspect of the present disclosure, a trailer controller wherein the towing system activation control signal is received in response to a user input.

In accordance with an aspect of the present disclosure, a trailer controller wherein the towing system activation control signal is generated in response to a hitch connection between a tow vehicle and a trailer.

In accordance with an aspect of the present disclosure, a trailer controller wherein the V2V communications transceiver is further configured for receiving a second tow vehicle response including a second tow vehicle location and a second tow vehicle identifier, determining a second distance between a trailer and a second tow vehicle and enabling the V2V communications link between the trailer and the first tow vehicle in response to the first distance being less than the second distance.

In accordance with an aspect of the present disclosure, a trailer controller wherein the location detector is a global positioning system receiver.

In accordance with an aspect of the present disclosure, a trailer controller wherein the V2V communications link is enabled in response to the first tow vehicle identifier matching a prior tow vehicle identifier associated within a previously enabled V2V communications link.

In accordance with an aspect of the present disclosure, a trailer control system including a transceiver for transmitting a trailer control link request, for receiving a first trailer control link response including a first vehicle location and a second trailer control link response including a second vehicle location, and receiving a control signal, a global positioning system receiver for determining a trailer location, a processor for enabling a trailer control link with a first vehicle in response to a first distance between the first vehicle location and the trailer being less than a second distance between the second vehicle location and the trailer, and a trailer controller for controlling a trailer braking system in response to the control signal received via the trailer control link.

In accordance with an aspect of the present disclosure, a trailer control system wherein the trailer control link request is transmitted in response to a user input.

The above advantage and other advantages and features of the present disclosure will be apparent from the following detailed description of the preferred embodiments when taken in connection with the accompanying drawings.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
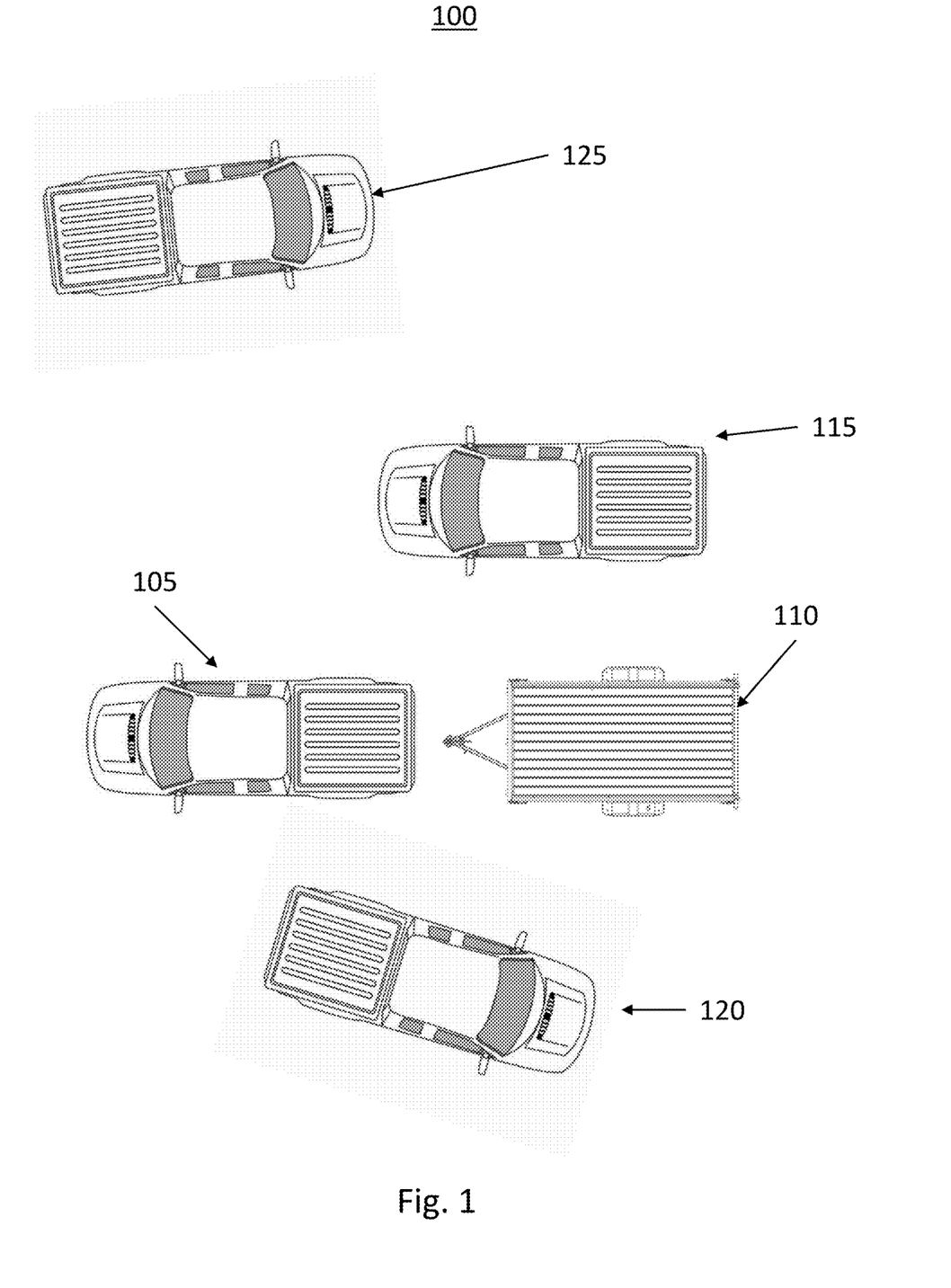
FIG. 1 shows an exemplary environment for use of the wireless trailer connection system according to an embodiment of the present disclosure.

Turning now to FIG. 1, an environment 100 for use of the wireless trailer connection system according to an exemplary embodiment of the present disclosure is shown. The exemplary environment 100 depicts a towing vehicle 105, a trailer 110, and a plurality of proximate vehicles 115, 120, 125.

Traditionally, trailer light and braking functions have been controlled by a wired connection between the trailer 110 and the tow vehicle 105. In the exemplary system, the towing vehicle 105 and the trailer 110 utilize Vehicle-to-Vehicle (V2V) communications, or other wireless communications protocols, to transfer data between the towing vehicle 105 and the trailer 110. Each of the trailer 110 and the towing vehicle 105 may utilize V2V modules to transmit and receive data used to control trailer braking and lighting functions based on V2V signals from the towing vehicle 105 without a wired connection. In addition, the exemplary system allows a trailer to be towed without an electrical connection between the tow vehicle and the trailer and eliminates the human factor in connecting a trailer to the tow vehicle.

A problem arises in establishing a V2V connection between the towing vehicle 105 and the trailer 110 if multiple potential towing vehicles 115, 120, 125 are within close proximity to the trailer. For example, at a boat launch or a campground, many potential towing vehicle and trailer pairs may exist. The exemplary system may allow the trailer system to monitor GPS location, heading, and velocity information from vehicles on the V2V network to identify the desired tow vehicle 105 that has been attached to the trailer 110. A computer implemented method differentiates the tow vehicle 105 from other vehicles 115, 120, 125 in the vicinity of the trailer using existing V2V signals. In some exemplary embodiments, the driver may establish the physical connection between the trailer 110 and the tow vehicle 105. In other exemplary embodiments, an advanced driver assistance system (ADAS) may control to the towing vehicle 105 in order to attach the tow-vehicle 105 to the trailer 110. Then, with the tow-vehicle 105 in run mode, the trailer V2V system will be activated with either a manual or automatic switch.

The exemplary V2V communications system between the towing vehicle 105 and the trailer 110 facilitates the trailer 110 to monitor braking information from the identified tow vehicle 105 and control trailer braking accordingly without the use of a wired connection between the tow vehicle 105 and trailer 110. The braking information may solely include an indication of the tow vehicle brakes being applied, or may include antilock braking information from the towing vehicle 105, inertial measurement unit (IMU) information generated in response to measurements from the towing vehicle 105 IMU unit, or specific instructions generated by a towing vehicle ADAS in response to a towing operation. The system may be enhanced by the use of the trailer anti-lock brake system and the communications of braking and control information between the towing vehicle 105 and the trailer 110.

In some exemplary embodiments, a control system within the trailer 110 may monitor V2V data from the towing vehicle 105 and deceleration data to determine the behavior of the trailer brake/turn indicator lamps. The wireless V2V connection may be used to provide camera feeds between the trailer 110 and the towing vehicle 105 and to provide collision warnings, such as during reversing operations, to the vehicle operator in the towing vehicle. V2V message standards already defined hard-braking, vehicle deceleration, vehicle heading, and vehicle location. The V2V communications link may further provide video captured by cameras on the trailer 110, such as a rear view camera on the back of the trailer 110, to the towing vehicle. This may aid a driver or a ADAS in reversing while performing reversing operations. In addition, other sensor data, such as IMU data, Lidar data, proximity sensor data, and the like may be provided from the trailer 110 to an ADAS controller in the towing vehicle 105.

Figure 2:
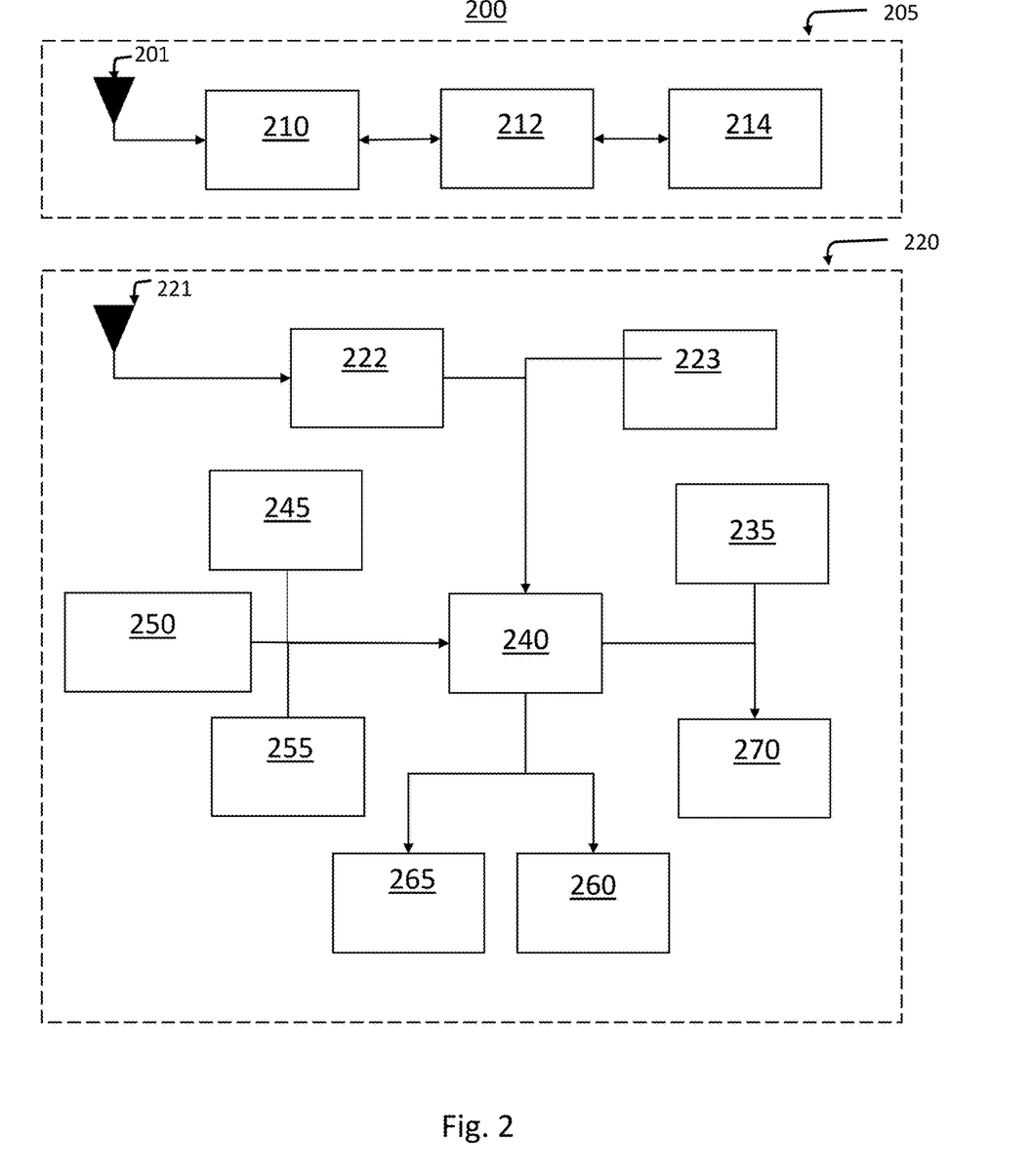
FIG. 2 shows a block diagram illustrating a system for implementing the wireless data connection for a towing operation according to an exemplary embodiment of the present disclosure.

Turning now to FIG. 2, a block diagram illustrating a system 200 for implementing the wireless data connection for a towing operation according to an exemplary embodiment of the present disclosure is shown. The exemplary system 200 may include a towing vehicle portion 205 and a trailer portion 220.

The towing vehicle portion 205 may include a vehicle V2V module 210 for enabling towing vehicle system communications over the V2V network. The V2V module 210 may transmit data and other information via the V2V communications via a towing vehicle antenna 201. The towing vehicle antenna 201 may be a dedicated V2V communications antenna or may be a common antenna used to transmit and receive other data, such as cellular network data, GPS data, or the like. The V2V module 210 may receive data and trailering control information from the vehicle processor 212. The vehicle processor 212 may generate the data and trailering control information, such as trailer light illumination information and trailer braking information, in response to ADAS algorithms, antilock braking algorithms, and driver control commands. In addition, the vehicle processor 212 may receive information from other towing vehicle sensors, such as a vehicle IMU 214, and use this sensor information to generate the data and trailering control information and/or convey this information directly to the trailer via the V2V communications network.

The trailer portion 220 of the exemplary system 200 may include a trailer V2V module 222 coupled to a trailer antenna 221. The trailer V2V module 222 may be configured to receive communications signals from the V2V network, convert the communications signals to a data format usable by the trailer control network, and to couple the data from the concerted communications signals to the trailer processor 240.

The trailer processor 240 may receive data from the trailer V2V module 222 and generated control signals in response to the received data. The trailer processor 240 may generate control signals to couple to the trailer lamp controller 265 for illuminating various trailer lights, such as brake lights, turn signal lights, reverse lights, and the like. The trailer processor 240 may further generating braking control signals in response to the received data to couple to the trailer braking controller 270. For example, if the data received from the towing vehicle is indicative of a towing vehicle braking operation and a level of brake application, the trailer processor 240 may generate a braking control signal indicative of a corresponding trailer brake application level to couple to the trailer braking controller 270.

In some exemplary embodiments, the trailer processor 240 may receive data from a trailer IMU 235 a trailer wheel spin sensor 250, a trailer GPS 245. The trailer processor 240 may use this data for an antilock braking algorithm performed by an antilock braking processor 270 or the like, in order to generate braking commands to couple to the trailer braking controller 270. The antilock braking algorithm may also use antilock braking data from the towing vehicle received via the trailer V2V module 222. The trailer processor 240 may further determine hazardous conditions in response to the received sensor data, such as excessive trailer sway or the like, and to transmit a warning signal to the towing vehicle via the V2V communications channel. The vehicle processor 212 may then take corrective action in response to the warning signal.

In some exemplary embodiments, the vehicle processor 212 may generate a tow system activation command to initiate the V2V connection between the tow vehicle portion 205 and the trailer portion 220. This tow system activation command may be generated in response to a user input that a trailering operation should be initiated. For example, after a user physically connects and secures the trailer to the trailer hitch of the towing vehicle, the user may initiate the wireless V2V communications between the tow vehicle and the trailer. This user input may be received from a user interface within a vehicle cabin, a button within the vehicle cabin, or an audio command received at a microphone within the vehicle cabin. Alternately, the towing vehicle may sense a physical connection to a trailer, such as capacitively or via a pressure sensor or suspension monitoring sensor, and automatically initiate the V2V communications connection between the trailer and the towing vehicle. For example, the suspension monitoring system of the towing vehicle may detect a new load on the back of the towing vehicle. The vehicle processor 212 may then initiate the communications connection to the trailer. If no trailer is present, the vehicle processor 212 may discontinue the paring process with the trailer after a duration of time.

In some situations, the trailer V2V module 222 may receive a request for trailer paring from a proximate tow vehicle intending to establish a V2V communications link with another trailer. For example, in a congested trailering environment, such as a boat ramp, the trailer V2V module 22 may receive the request to establish the V2V communications link and may retrieve previously stored tow vehicle identification information 255 to determine if a prior V2V communications link had been established. If a prior link had been established with the requesting tow vehicle, the processor 240 may respond to the V2V link establishment requires. If no prior link had been established, the trailer processor 240 may determine a distance to the requesting tow vehicle in response to a location received from the requesting tow vehicle and a trailer location determined in response to data from the trailer GPS 245. If the distance exceeds a predetermined distance, indicative a towing vehicle unlikely to be requesting a towing control link with the trailer, the request is ignored by the trailer processor 240.

If the requesting tow vehicle is within the predetermined distance from the trailer, the trailer processor may then compare a towing vehicle velocity, speed, direction of travel, or orientation to that of the trailer. If the vehicle is travelling in a different direction, or at a different speed to the trailer, it is unlikely that the V2V communications request is intended for that particular trailer and the request is ignored. If the trailer and the requesting tow vehicle are traveling at the same speed and in the same direction, the trailer processor 240 may the confirm the V2V communications connection with the requesting towing vehicle.

Figure 3:
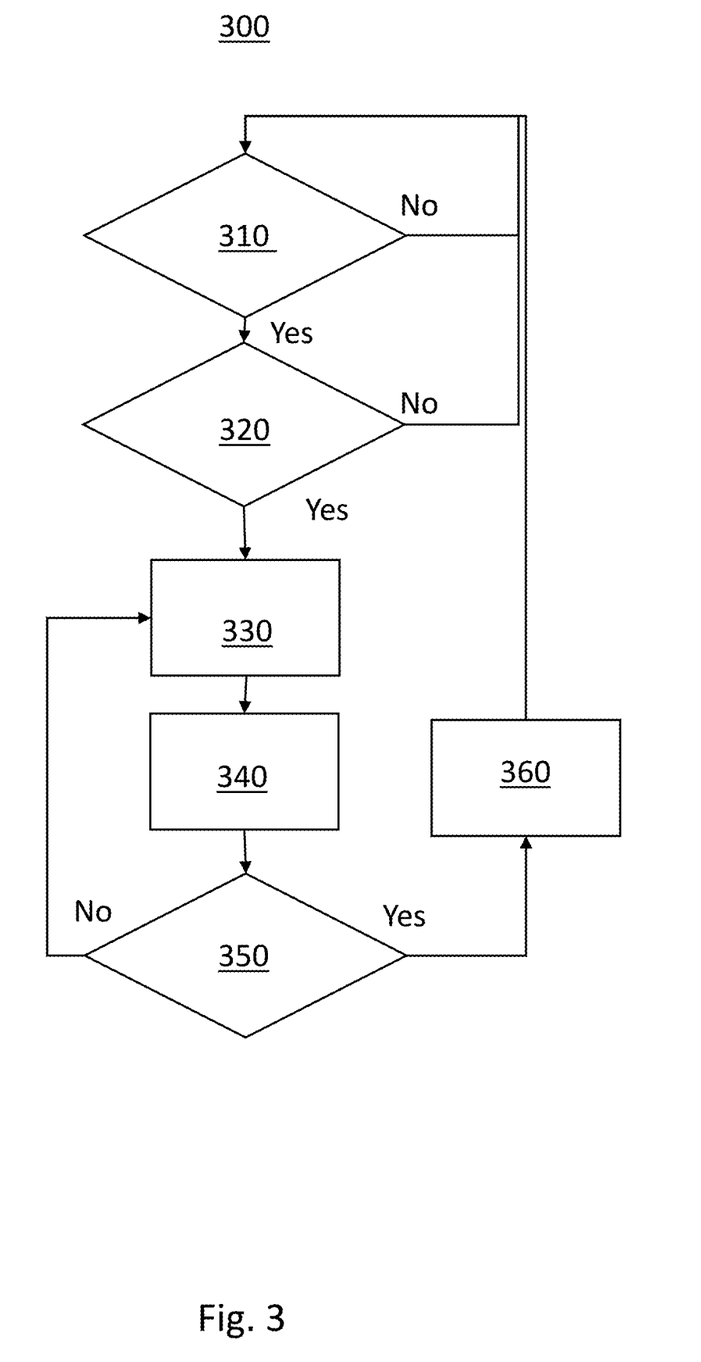
FIG. 3 shows a flow chart illustrating an exemplary method for controlling a trailer in response to a V2V communications link between a trailer and a tow vehicle according to an exemplary embodiment of the present disclosure.

Turning now to FIG. 3, a flow chart illustrating an exemplary method 300 for controlling a trailer in response to a V2V communications link between a trailer and a tow vehicle according to an exemplary embodiment of the present disclosure is shown. The method is first configured to receive 310 a towing request information from a towing vehicle. The towing request information may include a tow vehicle identifier, as well as location, a tow vehicle orientation, a tow vehicle velocity and the like. The tow vehicle identifier may be a unique alphanumeric indicator for the tow vehicle. If no towing request has been received, the method returns to waiting for a towing request.

In response to the request, the trailer may enable 320 the V2V connection with the tow vehicle. The trailer V2V module may enable the V2V communications link in response to the vehicle identifier and that a prior connection had been established with the tow vehicle. Alternatively, the trailer V2V module may enable the V2V communications link in response to a towing vehicle location, relative velocity to the trailer, tow vehicle orientation or the like. If the trailer V2V module is unable to authorize or establish a V2V connection, the method returns to waiting for a subsequent towing request.

In response to enabling the V2V connection, the trailer may next receive 330 trailer control commands from the towing vehicle over the V2V communications link. The trailer control commands may include braking commands including trailer brake application levels and lighting commands for the brake lights of the trailer. The trailer control commands may also include other trailer lighting control commands such as commands to illuminate other trailer lights, such as turn signals, running lights, reverse lights, and the like.

The method is next operative to control 340 the trailer systems in response to the trailer control commands. For example, if the method receives a request to apply the trailer brakes with a certain application force, the method then generates a control signal to couple to the brake controller indicative of the certain application. In response the brake controller activates the braking system such that the certain application force is applied to the trailer brakes.

The method may next receive 350 a control signal generated by the towing vehicle to discontinue the V2V communications. In response to the disconnect control signal, the method then discontinues 360 the V2V communications link with the towing vehicle and waits to receive 310 a subsequent towing request. Alternatively, if a duration of time elapses without communications received from the towing vehicle, the trailer control system may assume that the towing operation has been suspended and discontinue the V2V communications link.

Figure 4:
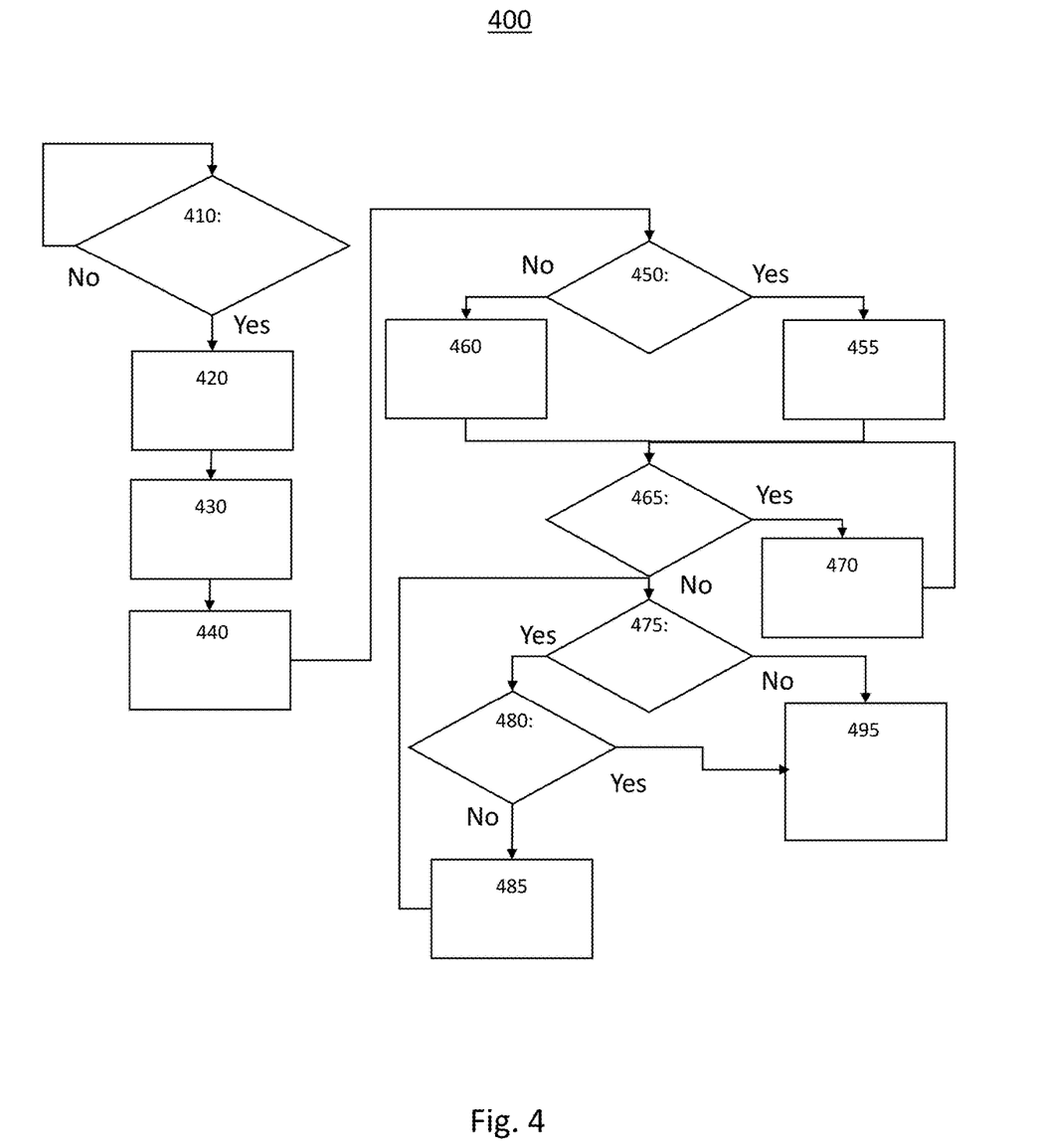
FIG. 4 shows a flow chart illustrating an exemplary method for establishing a V2V communications link between a trailer and a tow vehicle according to an exemplary embodiment of the present disclosure.

Turning now to FIG. 4, a flow chart illustrating another exemplary method 400 for establishing a V2V communications link between a trailer and a tow vehicle according to an exemplary embodiment of the present disclosure is shown. The method 400 is first configured to detect at 410 a trailer connection to a towing vehicle. The trailer connection may be determined in response to a change in angle of the trailer as detected by the trailer IMU. The trailer connection may be determined in response to a sensor within the trailer hitch or in response to a user input, such as activation via a switch, smartphone app, or other user interface.

In response to detecting the trailer connection at 410, the method 400 is activates at 420 the trailer system. Activation of the trailer system may include transitioning the trailer system from a standby or off mode to an active mode. Activation may include powering systems, such as trailer lighting systems or braking control systems, which may have been powered off during the standby mode. Activation of the trailer may include running system tests, system calibration algorithms, and receiving information, such as location information from a GPS, as an operational baseline for trailer control operations.

In response to detecting the trailer connection at 410, the method 400 transmits at 430 a request to proximate tow vehicles. The transmit request may indicate a trailer position, trailer identification, or the like. In response to the transmitted request, the method 400 receives at 440 a plurality of responses from proximate tow vehicles. The received requests may include a tow vehicle location, a tow vehicle identifier, a tow vehicle velocity, an orientation, and a tow vehicle speed.

In response to each of the received requests, the method 400 differentiates the intended tow vehicle from other vehicles in the vicinity of the trailer. If at 450 the trailer velocity (Vt) is equal to zero, the method discards at 460 all potential tow vehicles with a velocity greater than zero. The potential tow vehicle velocities (Vv) are determined in response to data received with the tow vehicle request responses received from the proximate tow vehicles. If at 450 the trailer velocity is not zero, the method 400 is configured to discard all potential tow vehicles with a velocity equal to zero. In some exemplary embodiments, if the tow vehicle velocity differs from the trailer velocity by a predetermined amount, such as 10%, the tow vehicle will be discarded from the potential tow vehicle list.

The method is next configured to determine 450 a distance to all the remaining potential tow vehicles in response to the trailer location and the received potential tow vehicle locations. If 465 the distance between the trailer and a potential tow vehicle exceeds a threshold distance, such as 2 meters, the vehicle is discarded 470 from a list of potential tow vehicles. In some exemplary embodiments, the initial array of potential tow-vehicles will be identified to contain all vehicles that have reported GPS positions that fall within a circle of radius L2 from the trailer position based on GPS data received with the responses to the tow requests. Before the tow-vehicle is moved, and the trailer speed is zero, the trailer will identify an array of potential tow-vehicles that have positions base on transmitted GPS data that are within a calibratable distance in any direction from the GPS determined position of the trailer. If 465 the distance between a tow vehicle and the trailer is less than the threshold distance, the method next determines if 475 there is less than 1 potential tow vehicle remaining. If more than one potential tow vehicle remains, the method next determines if 480 a potential vehicle is within the triangular zone in front of the trailer hitch mechanism. If the potential tow vehicle is not within the triangular zone in front of the trailer hitch mechanism, the potential tow vehicle is discarded from the list, and the method determines if 475 there is only one potential tow vehicle remaining. If only one potential tow vehicle remains, or if the potential tow vehicle is within the triangular zone, the method proceeds to activate 495 the V2V towing communications system with that potential tow vehicle. In some exemplary embodiments, a series of logical tests may be completed in parallel to eliminate potential tow vehicles from the array. When the potential vehicle array size contains only a single vehicle, the attached tow-vehicle identification is complete, and the system active indication will be activated with the remaining vehicle.

In some exemplary embodiments, the triangular zone in front of the trailer hitch mechanism may have a length (L2) that is determined by the distance from the GPS antenna on the trailer to the GPS antenna on the longest anticipated tow-vehicle to which the trailer could be connected. The triangular zone in front of the trailer hitch mechanism may have a calibratable width Dl.

If the trailer is in motion, in order to ensure the triangular zone in front of the trailer hitch mechanism tracks the tow vehicle while in a turn, the triangular zone in front of the trailer hitch mechanism in shall be offset from the trailer trajectory according to angle (θ) which will correspond to a chord of length (L$_2$) originating at the trailer's GPS antenna and located on the circle determined by the current turning radius of the trailer. If the trailer turning radius is zero, the Tow-Vehicle Location Zone will align with the trailer's current trajectory.

The Tow-Vehicle Zone Offset Angle (θ) may be determined in response to the trailer turning radius with IMU (R) as follows:

$$R(m) = \frac{V\left(\frac{m}{sec}\right)}{\omega\left(\frac{radians}{sec}\right)}$$

calculate θ

$$\ominus \text{ (radians)} = 2A\sin\left(\frac{L2}{2R}\right)$$

R=trailer turning radius (m)
V=trailer linear velocity (m/s)
ω=rate of change of trailer heading angle (radians/sec)
θ=offset angle of tow vehicle location zone If the trailer is not equipped with an IMU, the turning radius may be calculated using trailer geometry and trailer wheel odometry.

Figure 5:
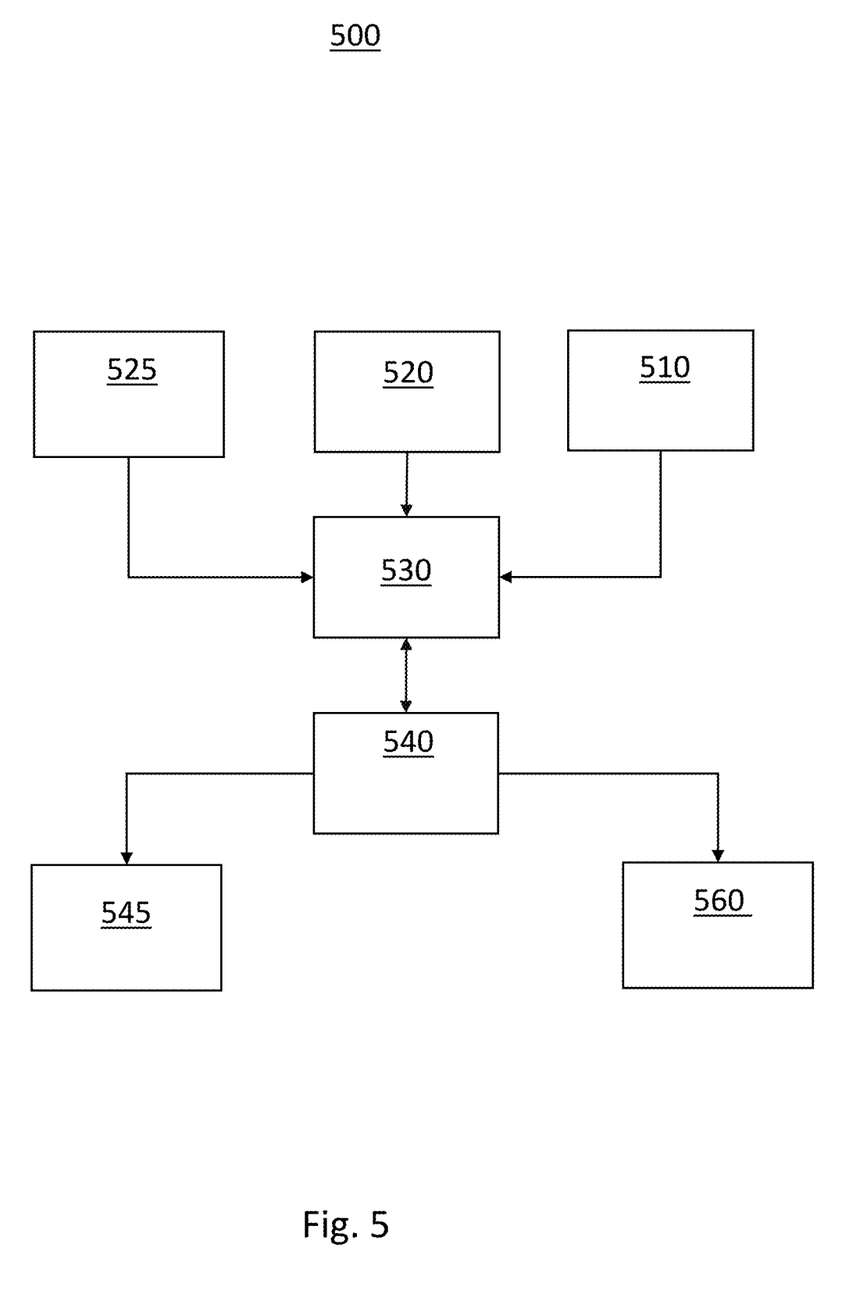
FIG. 5 shows a block diagram illustrating a system for establishing a V2V communications link between a trailer and a tow vehicle according to an exemplary embodiment of the present disclosure.

Turning now to FIG. 5, a block diagram of a trailer control system 500 employing wireless V2V communications between a towing vehicle and a trailer according to an exemplary embodiment of the present disclosure is shown. The exemplary trailer control system 500 may include a control input 510, a V2V communications transceiver 520, a location detector 525, a processor 530 and a trailer controller 540.

The exemplary trailer control system may include a control input 510 configured to receive a towing system activation control signal. In some exemplary embodiments, the towing system activation control signal may be received in response to a user input. Alternatively, the towing system activation control signal may be generated in response to a hitch connection between a tow vehicle and a trailer.

The V2V communications transceiver 520 may be a wireless transceiver coupled to an antenna for transmitting a tow vehicle request, receiving a first tow vehicle response including a first tow vehicle location and a first tow vehicle identifier. The V2V communications transceiver 520 may be further operative to receive a trailer control signal from a first tow vehicle via the V2V communications link and wherein the processor is further configured to control a trailer brake in response to the trailer control signal. The V2V communications transceiver 520 may be configured for receiving a second tow vehicle response including a second tow vehicle location and a second tow vehicle identifier, determining a second distance between a trailer and a second tow vehicle and enabling the V2V communications link between the trailer and the first tow vehicle in response to the first distance being less than the second distance.

The V2V communications transceiver 520 may be further operative to establish the V2V communications link with a first tow vehicle in response to the processor 530 enabling the V2V communications link. The V2V communications link is enabled in response to the processor 530 estimating the intended tow vehicle for the particular towing operation for the intended trailer. In some exemplary embodiments, the V2V communications link may be enabled in response to the first tow vehicle identifier matching a prior tow vehicle identifier associated within a previously enabled V2V communications link.

The location detector 525 configured for detecting a trailer location. The location detector may be a global positioning system receiver or a global navigation satellite system (GNSS). In some exemplary embodiments, the location detector 525 may determine the trailer location using triangulation determined in response to known infrastructure locations received via wireless vehicle to infrastructure (V2I) signals.

The processor 530 may be configured for determining a first distance between the first tow vehicle and the trailer in response to the first tow vehicle location and the trailer location and enabling the V2V communications link in response to the first distance being less than a threshold distance. In some exemplary embodiments, the threshold distance may be equal to two times the average tow vehicle length. In some exemplary embodiments the processor 530 may enable the V2V communications link in response to the tow vehicle being located in front of the trailer hitch.

The trailer controller 540 may be configured for controlling a trailer braking and/or a trailer lighting system in response to control signals received from the towing vehicle over the V2V communications link. The trailer controller 540 may receive trailer controls signals from the processor 530 generated in response to control signals received from the tow vehicle. These control signals may include antilock braking control signals determined by the tow vehicle antilock braking system and transmitted to the trailer via the V2V communications link. In response to the trailer control signals, the trailer controller 540 may generate braking control signals to couple to the trailer braking system 560. The trailer controller 540 may further generated trailer light control signals to couple to the trailer light system 545 in response to trailer light control signals received from the tow vehicle via the V2V communications link. The processor 530 may be configured to generate trailer light control signals and/or trailer braking control signals in response to detected conditions of the trailer. For example, if the trailer is moving and the ambient light indicates that the trailer is being towed at night, the processor 530 may generate a control signal to couple to the trailer controller 540 to illuminate the running lights of the trailer. Likewise, if the trailer is determined to be moving, but the trailer is not coupled to a tow vehicle, the processor 530 may generate a brake control signal to apply the trailer brakes. The processor 530 may further generate a user alert indicative of the moving trailer and provide a prompt for the user to release the brakes if the trailer movement is intentional.

In some exemplary embodiments, a trailer control system 500 may include a transceiver 520 for transmitting a trailer control link request, for receiving a first trailer control link response including a first vehicle location and a second trailer control link response including a second vehicle location, and receiving a control signal. The location detector 525 may be a global positioning system receiver for determining a trailer location. The processor 530 may be configured for enabling a trailer control link with a first vehicle in response to a first distance between the first vehicle location and the trailer being less than a second distance between the second vehicle location and the trailer. In some exemplary embodiments, the trailer controller for controlling a trailer braking system in response to the control signal received via the trailer control link. In some exemplary embodiments, the trailer control link request may be transmitted in response to a user input.

Figure 6:
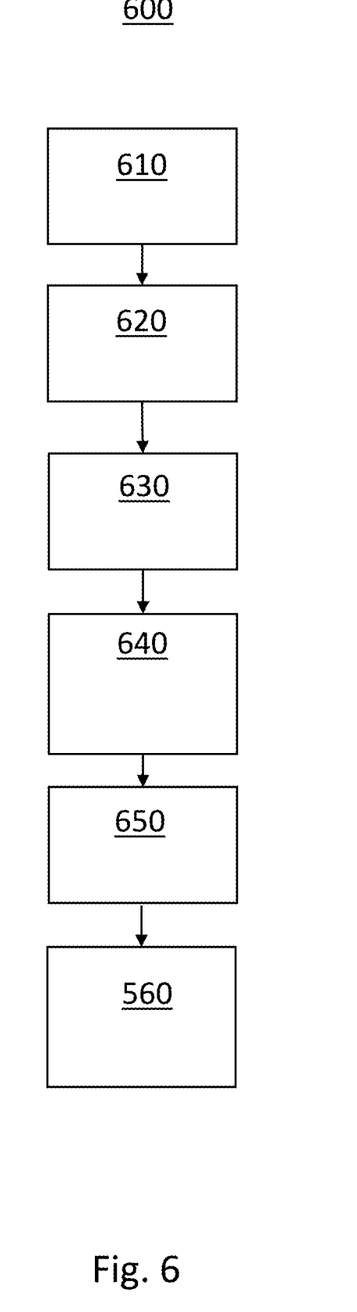
FIG. 6 shows another flow chart illustrating an exemplary method for establishing a V2V communications link between a trailer and a tow vehicle according to an exemplary embodiment of the present disclosure.

Turning now to FIG. 6, a flow chart illustrating an exemplary method 600 for implementing a trailer control system employing wireless V2V communications between a towing vehicle and a trailer according to an exemplary embodiment of the present disclosure is shown. The exemplary method may be performed by a processor within a trailer or within a trailer control module. The processor may be communicatively coupled to sensors, controllers, and interfaces within the trailer. The processor may further be communicatively coupled to a user interface, such as an application running on a smartphone or the like.

The exemplary method may first include enabling a V2V communications link between a trailer and a first tow vehicle including receiving 610 a towing system activation control signal, where the towing system activation control signal is received from a user interface. Alternatively, the towing system activation control signal may generated in response to a trailer hitch being coupled to a tow vehicle hitch. For example, a capacitive or pressure switch within a trailer hitch may generate a control signal coupled to a trailer processor indicative of the trailer hitch receiver being connected to a tow vehicle tow hitch ball.

In response to the towing system activation control signal, the method is next configured for transmitting 620 a tow vehicle request to proximate potential towing vehicles. The tow vehicle request may be transmitted wirelessly via a wireless communications network, such as a V2V communications network or the like. Alternatively, the tow vehicle request may be transmitted via a Wifi or cellular network. In some exemplary embodiments, the tow vehicle request may be audible sound or sound sequence generated by a trailer speaker or trailer horn.

In response to the transmitted request, the method is next configured for receiving 630 a first tow vehicle response from one or more proximate tow vehicles. These tow vehicle responses may including a tow vehicle location and a tow vehicle identifier, for each of the responding tow vehicles. In some exemplary embodiments, a first tow vehicle response from a first tow vehicle and a second tow vehicle response from a second tow vehicle may be received.

The method is next configured for determining 640 a distance between the tow vehicles and the trailer. Each of the tow vehicle response includes a tow vehicle location. The method may determine a trailer location in response to data received from a GPS receiver or the like. In some exemplary embodiments, the system may generate a list of potential tow vehicles with the tow vehicles ordered from closest to farthest.

The method may next be configured for enabling 650 the V2V communications link in response to a distance to a first tow vehicle being less than a threshold distance. In some exemplary embodiments, the threshold distance may be less than 14 meters or two times an average towing vehicle length. In some exemplary embodiments, the tow vehicle response includes a tow vehicle velocity. The V2V communications link may then be enabled in response to the tow vehicle velocity matching a trailer velocity. In some embodiments, the V2V communications link is enabled in response to a user confirmation at the tow vehicle. If the link is not confirmed at the tow vehicle, a V2V communications link may be established with the next closest tow vehicle.

In response to establishing the V2V communications link, the method may next be configured for receiving 660 a trailer control signal via the V2V communications link and controlling a trailering lighting system in response to the trailer light control signal. For example, the system may be configured for receiving a trailer brake control signal via the V2V communications link and controlling a trailer braking system in response to the trailer light control signal. In addition, the system may be configured for receiving a first tow vehicle antilock braking control signal via the V2V communications link and controlling a trailer antilock braking system in response to the first tow vehicle antilock braking control signal.

In some exemplary embodiments, the method may be further configured for receiving a second tow vehicle response including a second tow vehicle location and a second tow vehicle identifier, determining a second distance between the trailer and the second tow vehicle and enabling the V2V communications link between the trailer and the first tow vehicle in response to the first distance being less than the second distance.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for enabling a V2V communications link between a trailer and a first tow vehicle comprising:
  receiving a towing system activation control signal;
  transmitting a tow vehicle request;
  receiving a first tow vehicle response including a first tow vehicle location and a first tow vehicle identifier;
  determining a first distance between the first tow vehicle and the trailer; and
  enabling the V2V communications link in response to the first distance being less than a threshold distance.

2. The method of claim 1, wherein the threshold distance is less than 14 meters.

3. The method of claim 1, further including receiving a second tow vehicle response including a second tow vehicle location and a second tow vehicle identifier, determining a second distance between the trailer and a second tow vehicle and enabling the V2V communications link between the trailer and the first tow vehicle in response to the first distance being less than the second distance.

4. The method of claim 1, where the towing system activation control signal is received from a user interface.

5. The method of claim 1, wherein the towing system activation control signal is generated in response to a trailer hitch being coupled to a tow vehicle hitch.

6. The method of claim 1, wherein the first tow vehicle response includes a tow vehicle velocity and wherein the V2V communications link is enabled in response to the tow vehicle velocity matching a trailer velocity.

7. The method of claim 1, wherein the V2V communications link is enabled in response to a user confirmation at the first tow vehicle.

8. The method of claim 1, including receiving a trailer light control signal via the V2V communications link and controlling a trailering lighting system in response to the trailer light control signal.

9. The method of claim 1 including receiving a trailer brake control signal via the V2V communications link and controlling a trailer braking system in response to the trailer brake control signal.

10. The method of claim 1 including receiving a first tow vehicle antilock braking control signal via the V2V communications link and controlling a trailer antilock braking system in response to the first tow vehicle antilock braking control signal.

11. A trailer controller comprising:
a control input configured to receive a towing system activation control signal;
a V2V communications transceiver for transmitting a tow vehicle request, receiving a first tow vehicle response including a first tow vehicle location and a first tow vehicle identifier;
a location detector configured for detecting a trailer location; and
a processor configured for determining a first distance between a first tow vehicle and a trailer in response to the first tow vehicle location and the trailer location, enabling a V2V communications link in response to the first distance being less than a threshold distance.

12. The trailer controller of claim 11, wherein the V2V communications transceiver is further operative to establish the V2V communications link with the first tow vehicle in response to the processor enabling the V2V communications link.

13. The trailer controller of claim 11, wherein the V2V communications transceiver is further operative to receive a trailer control signal from the first tow vehicle via the V2V communications link and wherein the processor is further configured to control a trailer brake in response to the trailer control signal.

14. The trailer controller of claim 11, wherein the towing system activation control signal is received in response to a user input.

15. The trailer controller of claim 11, wherein the towing system activation control signal is generated in response to a hitch connection between a tow vehicle and the trailer.

16. The trailer controller of claim 11, wherein the V2V communications transceiver is further configured for receiving a second tow vehicle response including a second tow vehicle location and a second tow vehicle identifier, determining a second distance between the trailer and a second tow vehicle and enabling the V2V communications link between the trailer and the first tow vehicle in response to the first distance being less than the second distance.

17. The trailer controller of claim 11, wherein the location detector is a global positioning system receiver.

18. The trailer controller of claim 11, wherein the V2V communications link is enabled in response to the first tow vehicle identifier matching a prior tow vehicle identifier associated within a previously enabled V2V communications link.

19. A trailer control system comprising:
a transceiver for transmitting a trailer control link request, for receiving a first trailer control link response including a first vehicle location and a second trailer control link response including a second vehicle location, and receiving a control signal;
a global positioning system receiver for determining a trailer location;
a processor for enabling a trailer control link with a first vehicle in response to a first distance between the first vehicle location and a trailer being less than a second distance between the second vehicle location and the trailer; and
a trailer controller for controlling a trailer braking system in response to the control signal received via the trailer control link.

20. The trailer control system of claim 19 wherein the trailer control link request is transmitted in response to a user input.

* * * * *